United States Patent Office 3,371,902
Patented Mar. 5, 1968

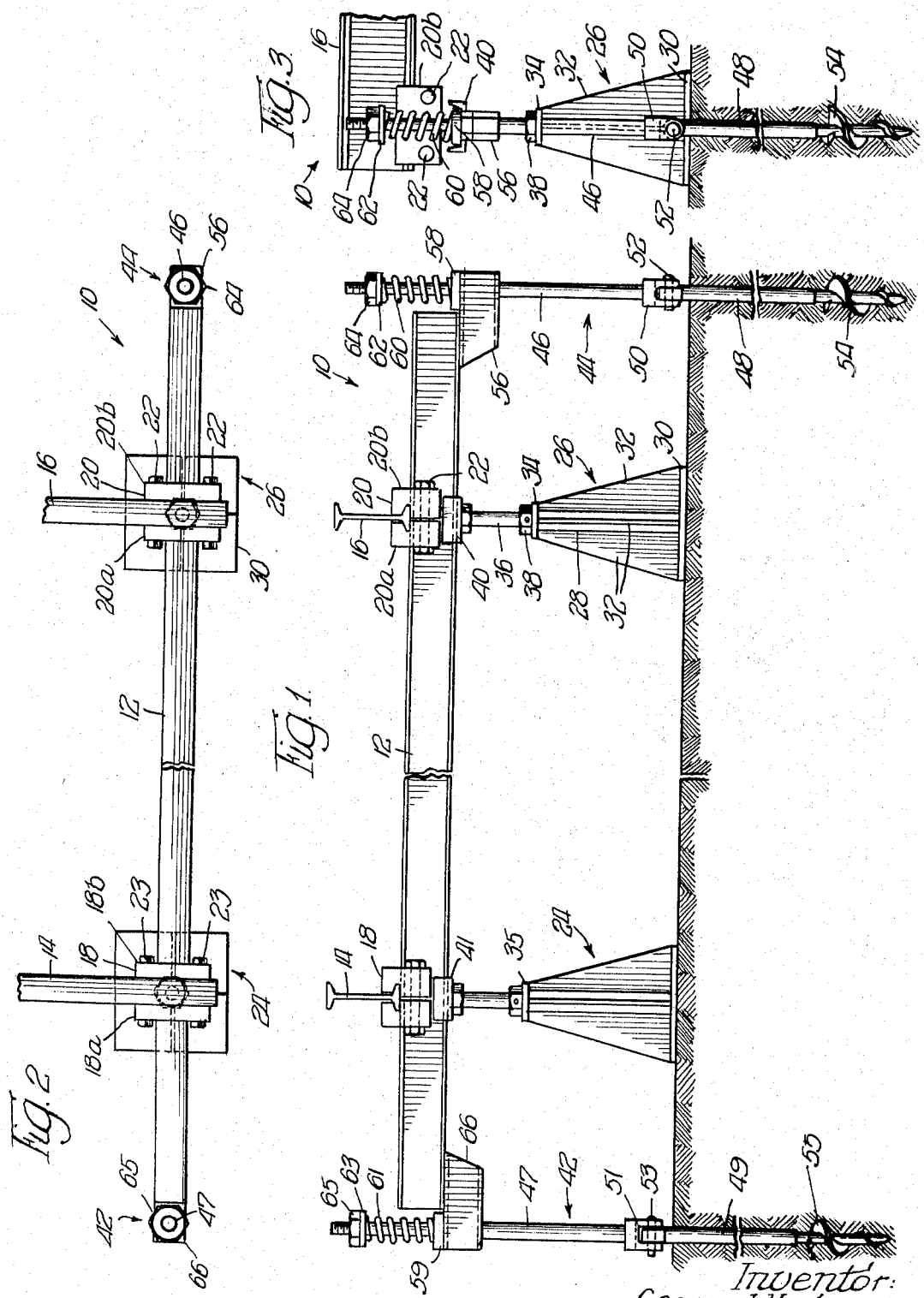

3,371,902
MOBILE HOUSE STABILIZER
George J. Hartwick, Box 758, Rte. 1,
Waukegan, Ill. 60085
Filed July 26, 1966, Ser. No. 567,885
6 Claims. (Cl. 248—354)

This invention pertains to stabilizer systems for vehicles and, more particularly, to a system for supporting and stabilizing mobile houses, trailers, campers, and the like.

Many such vehicles have only a single pair of wheels and necessarily require support when they are removed from the towing vehicle. Even in the case of larger mobile houses having more than one pair of wheels, the wheels are usually positioned so that support is required. Moreover, when such a vehicle is parked for a long period of time or made part of a semi-permanent installation, it is desirable to remove the load from the wheels. Many devices have been developed for these purposes; the more commonly used are simple standards and jacks. However, because such vehicles are normally occupied as homes, either permanent or temporary, it is desirable to provide some means for stabilizing the vehicles to dampen vibrations and resist more extreme vertical displacements. For example, a person walking from one side to the other of a mobile home might well cause substantial vertical movement of the vehicle. In addition, strong winds can cause tipping of the vehicle and in extreme cases can cause the vehicle to overturn. One solution to these problems has been to provide a rigid foundation around the entire outer periphery of the vehicle. This, of course, is very expensive and time consuming.

Accordingly, a principal objective of this invention is to provide a support and suspension system for mobile houses and similar vehicles which is portable, readily installed, and which maintains positive stabilization of the vehicle at all times.

A further object of this invention is a stabilizer system which is adjustable to accommodate any size of mobile house or similar vehicle.

Yet another object of this invention is to provide a stabilizer system for mobile houses and the like in which the stabilizing elements are firmly anchored to the ground.

Another object of this invention is to provide a stabilizer system for mobile houses and the like which is quickly and easily constructed from standard structural steel elements and consequently is of low cost.

A fuller understanding and appreciation of the foregoing objects as well as others will be derived from a consideration of the remainder of the specification and the claims, with specific reference to the drawing, in which latter:

FIGURE 1 is a front elevational view of a stabilizer system constructed in accordance with the invention;

FIGURE 2 is a top view of the construction depicted in FIGURE 1;

FIGURE 3 is a side elevational view of the construction depicted in FIGURE 1.

In general, the invention contemplates a main beam for supporting the chassis of the mobile house. (While the invention will be described as used in conjunction with a mobile house, it should be understood that it is equally capable of utilization with trailers, campers, and other similar vehicles.) The main beam is supported and maintained at the desired level above the ground by any suitable means, although preferably adjustable. The chassis members of the mobile house are secured to the main beam by a paid of clamps which are slideably attached to the main beam so that the system can accommodate chassis of varying widths. The main beam is preferably supported at or near the points where the chassis members are clamped. At each end of the main beam is a tension member which serves to stabilize the main beam. Essentially, this tension member comprises a rod which is firmly secured to the ground at one end and which has at its other end a compression spring or other resilient means capable of exerting a groundward force on the end of the main beam. Thus, any tipping or tilting movement of the mobile house will be resisted by the action of the tension member. It is possible to construct such a system from standard structural steel elements with a minimum of specially designed parts. Such a system is quite portable and easily installed, thus lending itself very well to use with vehicles that are frequently moved.

Referring specifically to the drawings, FIGURE 1 shows a stabilizer system, generally denoted by the reference numeral 10, which embodies the present invention. A main beam 12 is supported by a pair of lift jacks 24 and 26 which rest on the ground. The main beam 12 serves to support chassis members 14 and 16 of the mobile house. (The only portions of the mobile house illustrated are the chassis members 14 and 16.) The chassis members 14 and 16 are firmly secured to the main beam 12 by means of beam clamps 18 and 20, respectively.

The beam clamps 18 and 20 are designed to be slideable along the length of the main beam 12 so as to accommodate mobile house chassis of varying dimensions. The beam clamps 18 and 20 are identical in construction; therefore, it is necessary to describe only one in detail. In general, the beam clamp 20 takes the form of a box-like enclosure having two halves 20a and 20b. The beam clamp halves 20a and 20b have suitable cutout portions or apertures conforming to the shape of the main beam 12 and the chassis member 16. The beam clamp halves 20a and 20b are held together in snug relationship about the main beam 12 and the chassis member 16 by means of a pair of nut and bolt assemblies 22.

At the ends of the main beam 12 are outboard stabilizer assemblies 42 and 44 which serve to provide positive stabilization for the entire system. These cooperate respectively with stabilizer arms 66 and 56 to provide a continuous groundward stabilizing force on the ends of the main beam 12. Again, since the outboard stabilizer assemblies 42 and 44 are identical, it is necessary to describe only one in detail.

The outboard stabilizer assembly 44 includes a tension rod 46 and a stabilizer rod 48 connected by a hinge joint 50 and pin 52. The pin 52 may be secured by a cotter pin or other suitable means (not shown). The lower end of the stabilizer rod 48 has an auger portion 54 which, as shown in FIGURES 1 and 3, bores into the ground and firmly anchors the stabilizer assembly 44. The stabilizer arm 56 is attached to the main beam 12 near one end, and has an aperture through which the tension rod 46 may pass. The upper end of the tension rod 46 is threaded to accommodate an adjusting nut 64. A compression spring 60 is coiled about the tension rod 46 and is retained at its lower end by a spring retainer 58 which is attached to the stabilizer arm 56. A spring stop 62 cooperates with the adjusting nut 64 to retain the other end of the compression spring 60.

The lift jacks 24 and 26 are likewise identical and again only one need be described in detail. The lift jack 26 comprises a fixed lift member 28 which is attached to a ground plate 30. The fixed lift member 28 is tubular so as to accommodate a moveable lift member 36. The moveable lift member 36 is threaded through a lift nut 38 and passes into the interior of the fixed lift member 28. A set of four triangular ribs 32 are attached at their bottoms to the ground plate 30, along their vertical sides to the fixed lift member 28 and at their tops to a stop member 34. The stop member 34 is also attached to the fixed lift member 28 and serves as a stop for the lift nut 38. Attached at the upper end of the moveable lift member 36 is a lift cradle 40 which serves to receive the main beam 12. The jack 26 is operated by turning the lift nut 38, which causes the movable lift member 36 to be raised or lowered. The lift nut 38 may be provided with an aperture for receiving a lever arm or jack handle (not shown).

The installation and operation of the system shown in FIGURE 1 through 3 may now be described. The jacks 24 and 26 are positioned approximately beneath the chassis members 14 and 16 of the mobile house which is to be supported and stabilized.

The main beam 12 is then placed in the lift cradles 40 and 41 and the beam clamps 18 and 20 are moved into position directly beneath the chassis members 14 and 16 respectively. The clamp halves 18a and 18b and 20a and 20b are separated so that the chassis members 14 and 16 can fit between them. The jacks 24 and 26 are next raised until the main beam 12 contacts the chassis members 14 and 16. The clamp halves 18a and 18b and 20a and 20b are fitted about the chassis members 14 and 16, respectively, and are fastened together with the nut and bolt assemblies 23 and 22, thus firmly clamping the chassis members to the main beam 12.

The auger portions 54 and 55 of the outboard stabilizer assemblies 44 and 42 are anchored into the ground directly below the stabilizer arms 56 and 66. The upper ends of the tension rods 46 and 47 are then passed through the apertures in the stabilizer arms 56 and 66 and the lower ends of the tension rods are attached to the stabilizer rods 48 and 49 by means of joints 50 and 51 and pins 52 and 53. The compression springs 60 and 61 are positioned about the upper ends of the tension rods 46 and 47 and are secured by the spring stops 62 and 63 and the adjusting nuts 64 and 65.

Finally, the jacks 26 and 24 are raised to the desired elevation, causing compression of the springs 60 and 61. The springs 60 and 61 thus exert a continuous groundward force upon the ends of the main beam 12 and, consequently, dampen any vibrations and resist any tendency of the mobile house to tip or tilt. The groundward force exerted by the springs 60 and 61 may be varied by changing the setting of the adjusting nuts 64 and 65. In the same manner, the mobile house can be leveled to compensate for any slight disalignment of the jacks 24 and 26.

As shown in FIGURES 1 through 3, many of the components of the stabilizer system 10 can be constructed from commonly available structural steel elements. As an example, one such system has been designed employing a 10'-18" length of 5" x 10.0 steel I-beam as the main beam 12. The stabilizer arms 56 and 66 each comprise two 10-inch lengths of 4" x 5.4 channel welded together to form a closed rectangular element which is then welded to the main beam 12. The spring retainers 58 and 59 are 1-inch lengths of 3-inch standard black pipe and are welded to the stabilizer arms 56 and 66.

Still by way of example, the outboard stabilizer assemblies 44 and 46 may also employ many standard components. The tension rods 46 and 47 and the stabilizer rods 48 and 49 are principally constructed from lengths of 1-inch black pipe, with the overall length of the assemblies being about six feet. The auger portions 54 and 55 and the joint portions 50 and 51 are castings having 1-inch diameter projecting rods for insertion into the ends of the 1-inch black pipe. The pins 52 and 53 for the joints 50 and 51 are standard ¾-inch diameter button-head structural rivets. The upper ends of the tension rods 46 and 47 comprise 1-inch diameter standard bolts with the heads removed so that the unthreaded ends may be inserted into the ends of the 1-inch black pipe. The adjusting nuts 64 and 65 are standard nuts for these 1-inch bolts. The compression springs 60 and 61 are of $7/16$-inch carbon steel rod formed to an outer diameter of three inches, with a free height of six inches and a load rate of 500 pounds per inch.

The jacks 24 and 26 may likewise utilize standard structural elements. Again by way of example, in the jack 26, the fixed lift member 28 is a 15-inch length of 1¼-inch diameter black pipe and the moveable lift member 36 is a 1-inch diameter standard bolt twelve inches long. The lift nut 38 is a standard nut for the 1-inch bolt. The lift cradles 40 and 41 for the jacks 26 and 24 are 5-inch lengths of 5"-6.7 channel. The ground plate 30 and the ribs 32 of the jacks 26 are constructed from ½-inch and ⅜-inch plate, respectively.

In the above-described example, welded construction is used throughout. As can be seen from the foregoing, wide use of standard structural steel elements minimizes the number of specially fabricated parts required. Thus in the example, castings are necessary only for the beam clamps 18 and 20, the augers 54 and 55, the joints 50 and 51, the springs stops 62 and 63, and the jack stops 34 and 35. In this way the cost of the system is effectively minimized.

A particular advantage is gained through the fact that the stabilizer assemblies 42 and 44 are positioned outboard of the supporting jacks 24 and 26. For example, if a heavy wind were to blow from right to left in FIGURE 1, the force of the wind on the side of the mobile house would tend to tilt the vehicle about the fulcrum formed by the lift cradle 41. However, because the stabilizer assembly 44 is located well outboard of the jack 26, a long lever arm is created between the lift cradle 41 and the stabilizer assembly 44, thus providing a substantial mechanical advantage for the groundward force of the spring 60.

Although the invention has been described with the requisite particularity, the disclosure is of course only exemplary. Consequently, numerous changes in the details of construction and the size, configuration, and arrangement of components and materials will be apparent to those familiar with the art, and may be resorted to without departing from the scope of the invention as set forth in the following claims.

I claim:

1. A stabilizer system for a mobile house or similar vehicle, comprising a main beam member for supporting the chassis of said mobile house, means for clamping the chassis members of said mobile house to said main beam member, said means for clamping being slideably mounted upon said main beam member and moveable along the length thereof for registry with said chassis members, supporting means for maintaining said main beam member above ground level in a substantially horizontal attitude, and a pair of tension members, one of said tension members being positioned at each end of said main beam member outboard of said supporting means, and each of said tension members being secured at one end to the ground and having at its other end resilient means for exerting a groundward force upon the end of said main beam member.

2. A stabilizer system as defined in claim 1, wherein said supporting means is capable of being raised and lowered to vary the height of said main beam member above ground level.

3. A stabilizer system as defined in claim 2, wherein each of said tension members includes an auger portion at one end thereof for securing said tension member to the ground.

4. A stabilizer system as defined in claim 3, wherein said resilient means comprises a compression spring restrained at one end by a first stop attached to said tension member and restrained at its other end by a second stop attached to said main beam member.

5. A stabilizer system as defined in claim 4, wherein said first stop is adapted for limited movement along a portion of the length of said tension member, so as to vary the compression of said spring.

6. A stabilizer system as defined in claim 5, wherein said supporting means comprises a spaced pair of jacks.

References Cited

UNITED STATES PATENTS

| | | | |
|---|---|---|---|
| 861,252 | 7/1907 | Blagg | 296—23 |
| 1,300,021 | 4/1919 | Richards | 296—23 |
| 2,033,119 | 3/1936 | Bennett | 248—119 XR |
| 2,065,415 | 12/1936 | Aderholz | 5—119 |
| 2,162,181 | 6/1939 | Skinner | 248—354 |
| 3,054,151 | 9/1962 | Shankland | 52—23 |
| 3,067,846 | 12/1962 | Luebkeman | 52—157 |
| 3,155,373 | 11/1964 | Rae | 254—45 |
| 3,197,928 | 8/1965 | Frye | 52—157 |

ROY D. FRAZIER, *Primary Examiner.*

J. FRANKLIN FOSS, *Assistant Examiner.*